(12) United States Patent
Sajnovic et al.

(10) Patent No.: US 12,421,783 B2
(45) Date of Patent: Sep. 23, 2025

(54) REMOVABLE ROOFING SYSTEM COMPRISING A COMPENSATION DEVICE

(71) Applicant: INNOVACTION TECHNOLOGIES, Epercieux St Paul (FR)

(72) Inventors: Srecko Sajnovic, Epercieux St Paul (FR); Sylvain Denis, Villerest (FR)

(73) Assignee: INNOVACTION TECHNOLOGIES, Epercieux St. Paul (FR)

( * ) Notice: Subject to any disclaimer, the term of this patent is extended or adjusted under 35 U.S.C. 154(b) by 410 days.

(21) Appl. No.: 18/004,422

(22) PCT Filed: Jul. 5, 2021

(86) PCT No.: PCT/FR2021/051223
§ 371 (c)(1),
(2) Date: Jan. 5, 2023

(87) PCT Pub. No.: WO2022/008823
PCT Pub. Date: Jan. 13, 2022

(65) Prior Publication Data
US 2023/0279717 A1    Sep. 7, 2023

(30) Foreign Application Priority Data
Jul. 8, 2020   (FR) ..................... 2007236

(51) Int. Cl.
*E05F 15/643*      (2015.01)
*E04B 7/14*         (2006.01)
(Continued)

(52) U.S. Cl.
CPC .............. *E05F 15/643* (2015.01); *E04B 7/14* (2013.01); *E04B 7/166* (2013.01); *B60J 7/00* (2013.01);
(Continued)

(58) Field of Classification Search
CPC .......... E04B 7/14; E04B 7/166; E05F 15/643; E05Y 2900/516; E05Y 2900/542;
(Continued)

(56) References Cited

U.S. PATENT DOCUMENTS 1,263,759 A * 4/1918 Hanaway ............... B60J 1/2011
                                                        296/105
2,469,958 A * 5/1949 Fowler ..................... B60J 7/062
                                                        296/105
(Continued)

FOREIGN PATENT DOCUMENTS

| CA | 2575047 C | * 12/2007 | .............. B60J 7/062 |
| CA | 2759057 A1 | * 10/2010 | ............. E04B 7/166 |

(Continued)

OTHER PUBLICATIONS

International Search Report for Application No. PCT/FR2021/051223 (International Filing Date Jul. 8, 2020), mailed Jul. 5, 2021.

*Primary Examiner* — Jessie T Fonseca
(74) *Attorney, Agent, or Firm* — Christensen O'Connor Johnson Kindness PLLC

(57) ABSTRACT

Removable roofing system comprising a motor inserted inside a drum (2), a cord, a compensation device (4), two rigging rails (5a, 5b), at least one guide arch (6a) and removable roofing, the at least one guide arch (6a) being connected to the cord and to the removable roofing, and being designed so that each of its ends slides in a rigging rail (5a, 5b), the cord passing along each rigging rail (5a, 5b) and through the compensation device (4) and being connected at its two ends to the drum (2) so that the rotating of the drum (2) by the motor causes the cord to move in a direction dependent on the direction of rotation of the drum (2), deploying or retracting the removable roofing by moving the at least one guide arch (6a), each rigging rail (5a, 5b) being equipped with at least one end pulley (21a, 21b) and with at (Continued)

least two corner-block deflecting pulleys (20a, 20b, 23a, 23b) which are designed to guide the cord from the compensation device towards the at least one end pulley (21a, 21b), and the compensation device (4) is designed to automatically compensate for variations in cord tension.

11 Claims, 3 Drawing Sheets

(51) Int. Cl.
 *E04B 7/16* (2006.01)
 *B60J 7/00* (2006.01)
(52) U.S. Cl.
 CPC ... *E05Y 2201/664* (2013.01); *E05Y 2201/668* (2013.01); *E05Y 2201/684* (2013.01); *E05Y 2201/702* (2013.01); *E05Y 2900/13* (2013.01); *E05Y 2900/516* (2013.01); *E05Y 2900/542* (2013.01)
(58) Field of Classification Search
 CPC ..... B60J 7/00; B60J 7/061; B60J 7/062; B60J 7/063; B60J 7/064; B60J 7/065; B60J 7/066
 USPC .................................... 296/100.12, 100.18
 See application file for complete search history.

(56) References Cited

U.S. PATENT DOCUMENTS

| | | | | | |
|---|---|---|---|---|---|
| 3,415,260 | A | * | 12/1968 | Hall | B60P 7/02 52/63 |
| 4,032,186 | A | * | 6/1977 | Pickering | B60J 7/062 296/100.13 |
| 5,026,109 | A | * | 6/1991 | Merlot, Jr. | B60J 7/062 296/105 |
| 5,067,767 | A | * | 11/1991 | Biancale | B60J 7/062 296/105 |
| 5,080,423 | A | * | 1/1992 | Merlot | B60J 7/062 296/105 |
| 5,145,230 | A | * | 9/1992 | Biancale | B60J 7/062 296/100.13 |
| 5,253,914 | A | * | 10/1993 | Biancale | B60J 7/062 296/105 |
| 5,338,084 | A | * | 8/1994 | Wardell | B60J 7/062 296/105 |
| 5,546,972 | A | * | 8/1996 | Wardell | B60J 7/062 296/105 |
| 5,690,377 | A | * | 11/1997 | Denyer | B60J 7/062 296/100.15 |
| 5,938,270 | A | * | 8/1999 | Swanson | B60J 7/062 296/105 |
| 6,142,554 | A | * | 11/2000 | Carroll | B60J 7/062 296/100.11 |
| 6,435,595 | B1 | * | 8/2002 | Chenowth | B60J 7/062 74/89.22 |
| 6,481,779 | B1 | * | 11/2002 | Gothier | B60J 7/062 296/105 |
| 8,240,740 | B2 | * | 8/2012 | Chenowth | B60J 7/062 296/100.11 |
| 8,359,994 | B1 | * | 1/2013 | Highfield | B63B 19/18 114/361 |
| 8,579,353 | B1 | * | 11/2013 | Aulick | B60J 7/062 296/100.18 |
| 8,661,575 | B2 | * | 3/2014 | Chapus | E04H 4/086 4/500 |
| 9,404,281 | B1 | * | 8/2016 | Donnay | E04H 15/52 |
| 11,623,556 | B2 | * | 4/2023 | MacCready | B60P 3/1041 296/100.12 |
| 2003/0067185 | A1 | * | 4/2003 | Gothier | B60J 7/062 296/100.11 |
| 2006/0125278 | A1 | * | 6/2006 | Merlot, Jr. | B60J 7/065 296/100.11 |
| 2011/0084513 | A1 | * | 4/2011 | Chenowth | B60J 7/062 296/100.12 |
| 2014/0210228 | A1 | * | 7/2014 | Cramaro | F16H 19/06 296/100.11 |
| 2017/0259652 | A1 | * | 9/2017 | Cramaro | B60J 7/068 |

FOREIGN PATENT DOCUMENTS

| | | | | |
|---|---|---|---|---|
| DE | 20 2019 106423 | | 2/2020 | |
| EP | 2135763 | A1 * | 12/2009 | ............ B60J 7/062 |
| EP | 3842269 | A1 * | 6/2021 | ............ B60J 7/062 |
| FR | 2 480 203 | | 10/1981 | |
| GB | 2135259 | A * | 8/1984 | ............ B60J 7/062 |
| WO | WO 96/33882 | | 10/1996 | |
| WO | WO-9633882 | A1 * | 10/1996 | ............ B60J 7/062 |
| WO | WO 2007/124787 | | 11/2007 | |
| WO | WO-2010118534 | A1 * | 10/2010 | ............ E04B 7/166 |

\* cited by examiner

[Fig 1]
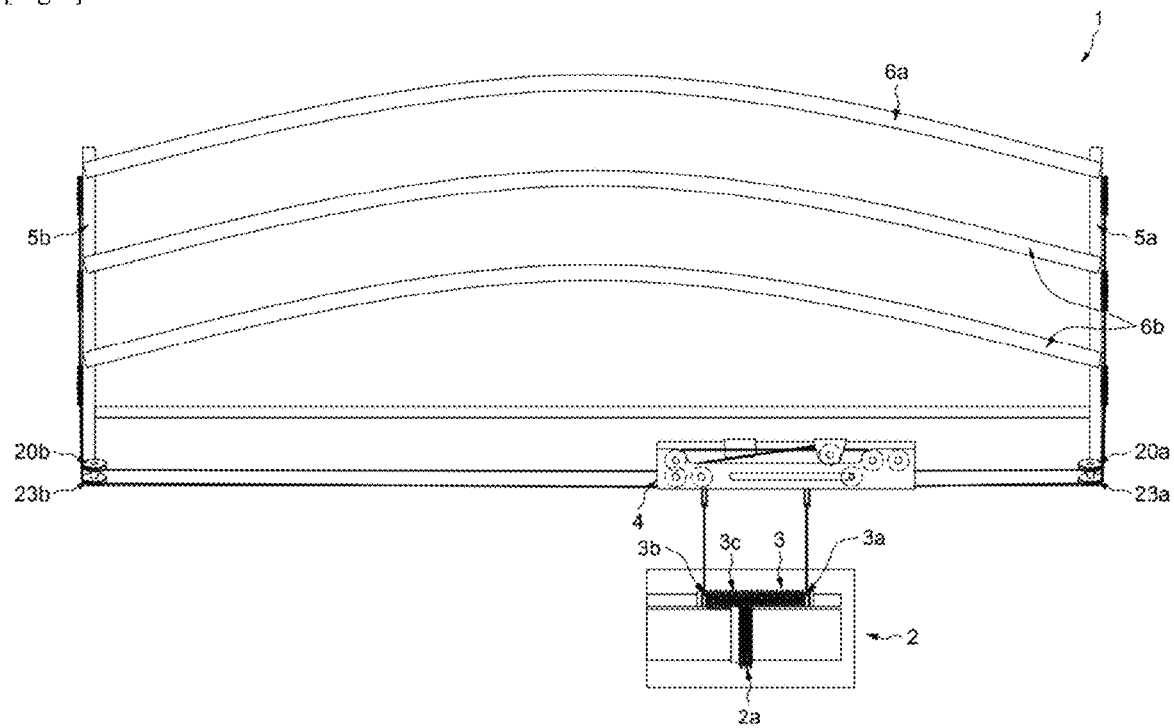
[Fig 2]
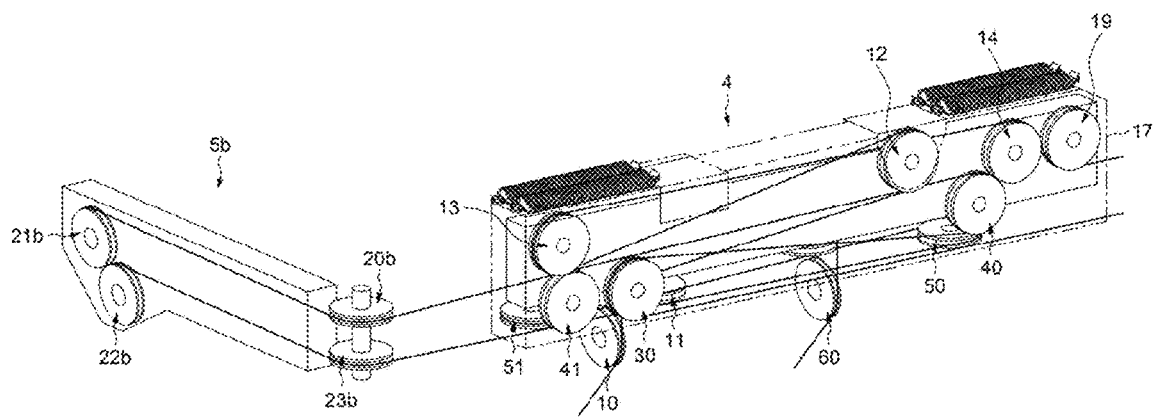

[Fig 3]
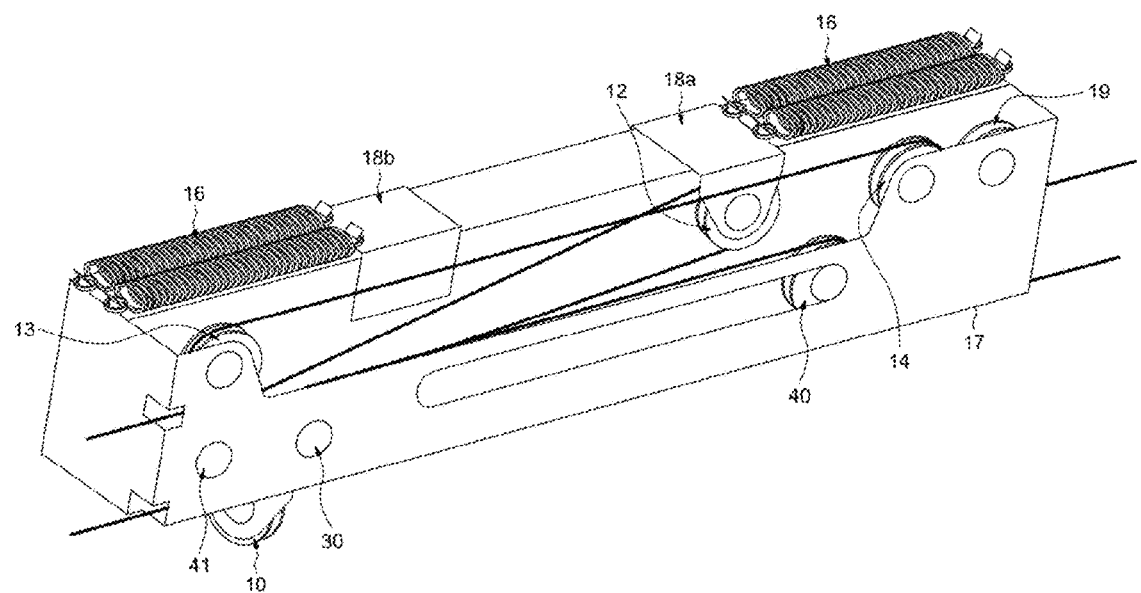
[Fig 4]
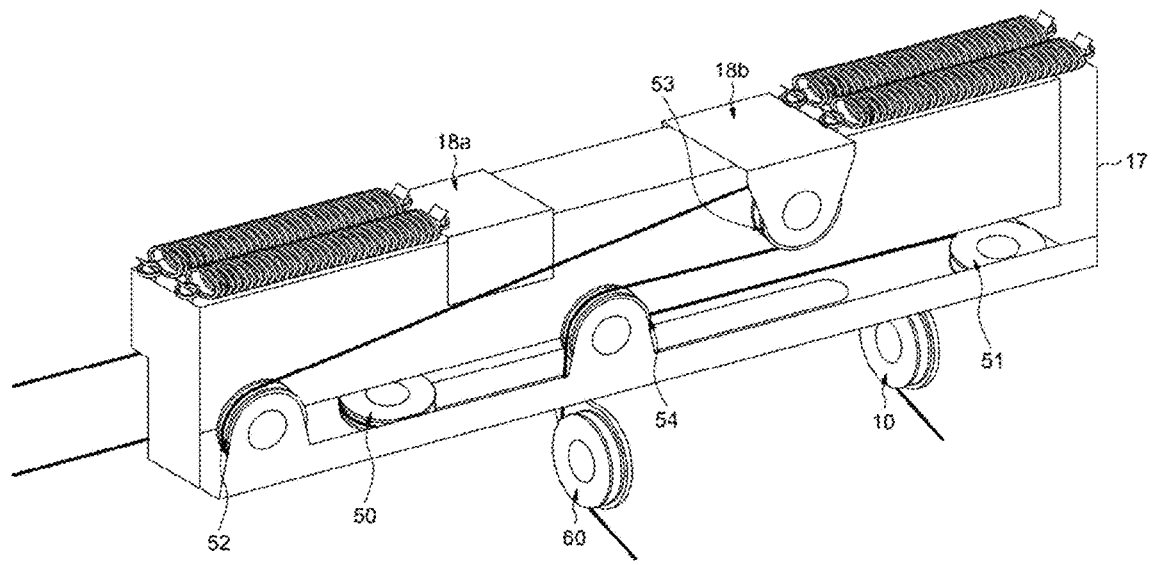

[Fig 5]
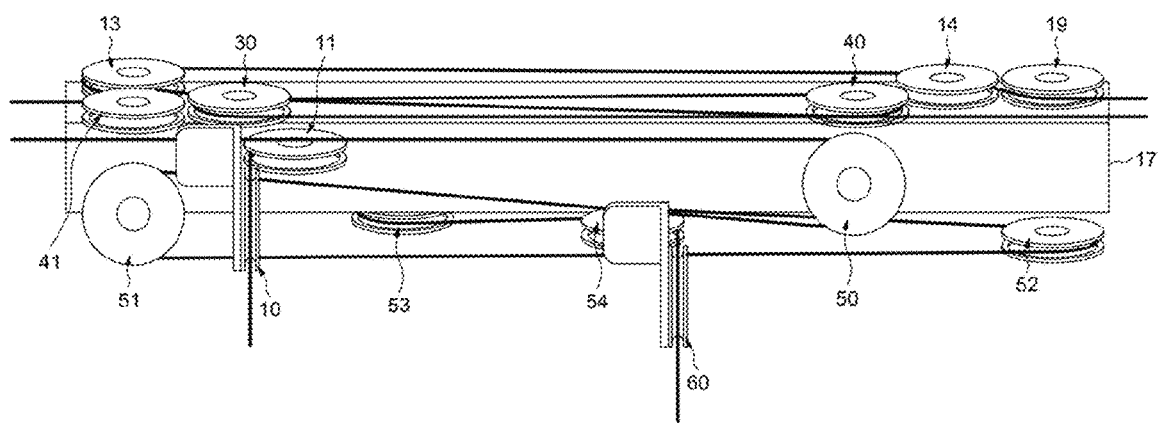

REMOVABLE ROOFING SYSTEM COMPRISING A COMPENSATION DEVICE

TECHNICAL FIELD

The technical field of the invention is tension compensation devices in cords and removable roofing systems comprising such compensation devices.

STATE OF PRIOR ART

A removable roofing system enables an opening to be covered or uncovered by driving guide arches connected to a removable roofing. The arches are usually supported by a rail and fastened to a drive cable that enables them to be moved back and forth, driving the removable roofing as they are moved.

Such systems are used, for example, as roofing for truck boxes.

In the state of the art, document WO2009-027285 is known describing a removable roofing system for truck boxes. This system comprises wire cables connected to a guide arch and moved by at least one motor. However, it has been found that such a system is subject to tension losses in the wire cables following an impact on an arch during loading. The same tension losses also occur over time during normal use of the system due to ageing of the wire cables. The tension loss in the wire cables can only be resolved by changing them. This maintenance operation requires a long downtime of the truck box.

Also known is the applicant's document WO2014-012895A1, which describes a winding/unwinding system to address the issues of cable tension and shift of the roofing guide arch.

This system is an improvement on previous systems because of the automatic tension compensation of the pull cords, especially during impacts on the arches.

However, despite this automatic compensation, the system can still have failures when the guide arch is subjected to excessive stress. This can occur when the guide arch comes into contact with an unexpected obstacle, preventing the arch from moving further. The failures are caused by excessive bias on the return spring of the rigging rail end wheel, ultimately reducing its stiffness and as a result the tension of the system.

Such a removable roofing system also has a too large overall size at the winding drum and motor, especially when the towing vehicle rotates in relation to the semi-trailer. Indeed, the outer compensation devices and pulleys are located on the sides of the trailer, which increases the overall size. The roofing system then interferes with the towing vehicle when the truck is turning.

It thus appears that the removable roofing systems according to the state of the art require a highly significant maintenance, leading to a very high operational cost. For these reasons, as well as the tediousness of its daily use, the roofing system for truck boxes is very little used, despite the benefits in terms of fuel consumption and protection of the transported materials.

There is therefore a need for a removable roofing system that is more resistant to mechanical stress.

There is also a need for a more compact removable roofing system.

DISCLOSURE OF THE INVENTION

The invention relates to a removable roofing system comprising a motor inserted inside a drum, a cord, a compensation device, two rigging rails, at least one guide arch and a removable roofing, the at least one guide arch being connected to the cord and to the removable roofing, and being designed so that each of its ends slides in a rigging rail, the cord passing along each rigging rail and through the compensation device and being connected at its two ends to the drum, so that the rotating of the drum by the motor causes the cord to move in a direction dependent on the direction of rotation of the drum, deploying or retracting the removable roofing by moving the at least one guide arch.

Each rigging rail is equipped with at least one end pulley and at least two corner-block deflecting pulleys designed to guide the cord from the compensation device to the at least one end pulley, and the compensation device is designed to automatically compensate for variations in cord tension.

The removable roofing system may comprise at least one follower arch, connected only to the removable roofing and being designed so that each of its ends slides into a rigging rail.

The arches may be able to absorb a shock applied thereto.

The drum can be equipped in its central part with a crown forming a first worm, the removable roofing system further comprising a guide device equipped with two pulleys connected to each other by a threaded cylinder forming a second worm, designed to mesh into the first worm, so that the guide device is rotatably and translationally driven when the drum is rotating, the pulleys then moving at such a speed that they are always aligned with the winding point of the cord on the drum.

The compensation device may comprise an elongate central support, two staples slidably mounted onto the central support, at least two return springs and pulleys, the first staple carrying a seventh pulley and being connected to a first end of the compensation device by at least one spring so as to compensate for the tension exerted by the cord on the seventh pulley, the second staple carrying an eighth pulley and being connected to a second end of the compensation device by at least one spring so as to compensate for the tension exerted by the cord on the eighth pulley, a first set of pulleys for returning the cord from the drum to the first rigging rail, a second set of pulleys for returning the cord from the first rigging rail to the second rigging rail, a third set of pulleys for returning the cord from the second rigging rail to the drum.

Each staple may comprise a first part, a second part and a third part contiguous to each other, the first and third parts facing each other, the staples being arranged on the central support so that their first and third parts are arranged on either side.

The first part of a first staple can support the seventh pulley on its inner face, the third part of a second staple then supporting the eighth pulley also on its inner face.

The springs can be arranged on the second face of the compensation device and are connected to the second parts of the staples.

The second set of pulleys may comprise a fourth pulley arranged in a slot provided in the trim of the compensation device so as to be able to change its position, the setting of the position of the fourth pulley enabling the difference in position between the two ends of the at least one guide arch to be set, in order to adjust its alignment.

The third set of pulleys may comprise a fifth pulley arranged in a slot provided in the trim of the compensation device so as to be able to change its position, the setting of the position of the fifth pulley enabling the tension of the cord to be set.

A further object of the invention relates to the application of the above defined roofing system to the roofing of a truck, a truck trailer or a building.

BRIEF DESCRIPTION OF THE DRAWINGS

Other purposes, characteristics and advantages of the invention will become apparent upon reading the following description, which is given only as a non-limiting example and is made with reference to the appended drawings in which:

FIG. 1 illustrates a roofing system according to the invention,

FIG. 2 illustrates the passage of the cord through the compensation device and a second rigging rail, FIG. 3 illustrates a first face of the compensation device, FIG. 4 illustrates a third face of the compensation device, and FIG. 5 illustrates a fourth face of the compensation device.

DETAILED DESCRIPTION

FIG. 1 illustrates a removable roofing system 1 according to the invention comprising a motor, in particular a tubular motor, inserted inside a drum 2, a cord, a compensation device 4, two rigging rails 5*a*,5*b*, at least one guide arch 6*a* and a removable roofing not illustrated for reasons of legibility. According to the embodiments, the removable roofing system also comprises at least one follower arch 6*b*.

As will be explained later, a guide arch 6*a* is connected to the cord and to the removable roofing while a follower arch 6*b* is connected only to the removable roofing and they are designed so that their ends slide in the rigging rails 5*a*,5*b*. Thus, the cord being moved by the motor enables the guide arch 6*a* to be moved. As a result, the movement of the guide arch 6*a* is transmitted to the follower arches 6*b* either via the traction applied to the removable roofing, or via the pressure resulting from the guide arch 6*a* bearing on the follower arches 6*b*.

Each guide arch 6*a* and each follower arch 6*b* is equipped with a slider at each end, designed so that each can move on a different rigging rail without being able to come off it. The sliders of the guide arch 6*a* are additionally connected to the cord so that the movement imposed on the cord is transmitted to the guide arch 6*a*. Compared to the state of the art, only one cord and one motor are required to move both ends of the control arch. This avoids a shift in the position of the ends of the control arch when an obstacle is in the path of the arch in proximity to a rigging rail, which occurs when two different cords or ropes are used for each end of the control arch.

In addition, the arches 6*a*,6*b* are capable of absorbing a shock applied thereto so as to limit the tension applied to the cord in such a situation. They therefore contribute to the self-tensioning aspect of the removable roofing system with the compensation device 4.

The rigging rails 5*a*,5*b* are arranged on either side of the surface to be covered and both receive the same drive cord. They are equipped with at least one end pulley and two corner-block deflecting pulleys.

Both ends of the drive cord are connected to a drum 2 which is rotated by a motor. From a first end connected to the drum 2, the cord passes successively through the compensation device 4, a first rigging rail 5*a*, again the compensation device 4, the second rigging rail 5*b*, then again the compensation device 4, and finally back to the drum 2. Such an arrangement enables only one cord to be required instead of the two cords generally required in the state of the art, and enables the tension to be compensated in three separate parts of the cord with a single compensation device 4.

FIGS. 1 and 2 show that the cord enters the compensation device 4 via a first pulley 10, exits via a second ninth pulley 19 to a first corner-block deflecting pulley 20*a* of the first rigging rail 5*a*. The cord then extends in the rigging rail to a first end pulley before returning to a second corner-block deflecting pulley 23*a* of the first rigging rail. In an advantageous embodiment, a second end pulley is arranged at the end of the rail so as to apply a stress to the cord at the output of the first end pulley. FIG. 2 illustrates the placement of these pulleys for the second rigging rail 5*b*. The first corner-block deflecting pulley 20*b*, the first end pulley 21*b*, the second end pulley 22*b* and the second corner-block deflecting pulley 23*b* can be seen.

At the output of the second corner-block deflecting pulley 23*a* of the first rigging rail 5*a*, the cord re-enters the compensation device 4 via a third pulley 30 to a fourth pulley 40 from which the cord exits the compensation device 4.

The cord then travels through the second rigging rail 5*b* in a similar manner to the way it travels through the first rigging rail 5*a*. More precisely, from the fourth pulley 40, the cord travels to a first corner-block deflecting pulley 20*b* of the second rigging rail 5*b*. The cord then extends in the rigging rail to a first end pulley 21*b* before returning to a second corner-block deflecting pulley 23*b* of the second rigging rail. In an advantageous embodiment, a second end pulley 22*b* is arranged at the end of the rail so as to apply a stress to the cord at the output of the first end pulley 21*b*.

At the output of the second end pulley 23*b* of the second rigging rail 5*b*, the cord re-enters the compensation device 4 via a fifth pulley 50. The cord exits the compensation device 4 via a sixth pulley 60 to the drum 2.

In a particular embodiment, the drum 2 is equipped in its central part with a crown 2*a* forming a first worm. A guide device 3 comprises two pulleys 3*a*,3*b* connected to each other by a cylinder 3*c* equipped with a thread forming a second worm, designed to mesh into the first worm. The two pulleys 3*a*,3*b* and the cylinder 3*c* are freely translationally mounted onto a shaft or cylinder extending along the drum, so that the guide device 3 is rotatably and translationally driven when the drum 2 is rotating. Due to the size and pitch of the worms, the pulleys 3*a*,3*b* move at such a speed that they are always aligned with the winding point of the cord on the drum 2. The guide device 3 thus guides the cord between the drum 2 and the first pulley 10 and between the drum 2 and the sixth pulley 60. The effect of the guide device 3 is to guide the cord so that it lies in a plane normal to the drum 2 during winding. This ensures that the cord is densely wound onto the drum 2 without the risk of winding errors that can block the system, especially when the tension in the system changes during an impact with the removable roofing.

The compensation device 4 comprises four side faces and two ends. FIGS. 3 and 4 illustrate a first face and a third face of the compensation device, respectively. The compensation device 4 comprises an elongate central support 17, two staples 18*a*,18*b* slidably mounted onto the central support 17, at least two return springs 16, pulleys and an external trim.

Each staple 18*a*,18*b* is formed from a U-shaped folded piece comprising a first part, a second part and a third part contiguous to each other, the first and third parts facing each other.

The staples 18a,18b are arranged so that their first, second and third parts correspond to the first, second and third faces of the compensation device 4, respectively.

The first part of a first staple 18a supports a seventh pulley 12 on its inner face. The first staple 18a is connected to a first end of the compensation device 4 by at least one spring 16 so as to compensate for the tension exerted by the cord on the seventh pulley 12. A cord has the advantage over a wire cable that it can be deformed, and thus compensate for a first level of stress in the removable roofing system. In addition, a cord is not subject to the contraction and thermal expansion effects to which a metal rope is subject. The removable roofing system according to the invention is thus less susceptible to failure in winter or summer due to a change in the length of the metal ropes.

The third part of a second staple 18b supports an eighth pulley 53 also on its inner face. The second staple 18b is, in turn, connected to a second end of the compensation device 4 by at least one spring 16 so as to compensate for the tension exerted by the cord on the eighth pulley 53.

In a particular embodiment, the springs 16 are arranged on the second face of the compensation device 4 and are connected to the second parts of the staples 18a,18b. Such a positioning minimises the depth of the compensation device 4.

The sliding staples 18a,18b, the springs 16 and the pulleys 12,53 automatically compensate for the forces exerted on the removable roofing via the cord, both by its actuation and by external actions such as impacts or stresses on the rigging rails. They also enable the compensation of the forces to be distributed over several springs 16 in order to improve their endurance.

The external trim extends along the first, third and fourth faces of the compensation device 4, providing a space for the sliding of the staples 18a,18b, the passage of the pulleys fastened to the staples and the travel of the cord.

The trim on the first face receives a ninth pulley 19 fastened in proximity to the first end and the second face, a tenth pulley 14 in proximity to the ninth pulley 19 and the second face, and an eleventh pulley 13 is fastened in proximity to the second end and the second face.

The trim on the first face also receives a twelfth pulley 41 fastened in proximity to the second end and the fourth face, a third pulley 30 in proximity to the ninth pulley 19 and the fourth face and a fourteenth pulley 11 fastened in proximity to the third pulley 30 and the fourth face.

A longitudinal notch is provided centrally in the trim in proximity to the fourth face, so that one of its ends is in proximity to the fourteenth pulley 11. This notch receives a fourth pulley 40 via a fastener enabling the position of the fourth pulley 40 to be set by movement in the notch. The setting of the position of the fourth pulley enables the difference in position between the two ends of the guide arch 6a to be set, in order to adjust its alignment.

The trim on the third face receives a sixteenth pulley 52 in proximity to the first end and the fourth face and a seventeenth pulley 54 in the central part in proximity to the fourth face.

The trim on the fourth face receives a fifth pulley 50 fastened in a setting notch in proximity to the first end and a nineteenth pulley 51 fastened in proximity to the second end and the third face. The setting notch of the fifth pulley 50 is provided centrally in the trim and is similar to the setting notch of the fourth pulley 40. Setting the position of the fifth pulley 50 enables the tension of the cord at the removable roofing system to be set. FIG. 5 illustrates the fourth face of the compensation device.

Fastening means, illustrated in FIGS. 1 and 2, are provided for fastening the compensation device 4 to a surface, so that the third face of the compensation device 4 faces the fastening surface.

The compensation device 4 thus designed and equipped with the fastening means can be placed on the part of the truck box or trailer leaning against the cab or the towing vehicle.

The removable roofing system comprising such a compensation device 4 coupled to the described rigging rails and to a drum 2 rotated by an electric motor enables the whole turning radius of the towing vehicle to be kept while maintaining the cord at an optimal tension. In addition, maintenance of the compensation device 4 is simplified, in particular by means of direct access to the position settings of the pulleys 40 and 50, as well as to the return springs 16.

The removable roofing system can also be used on any vehicle to close off all or part of at least one side.

More generally, the removable roofing system can also be placed on a building so as to cover an opening in said building.

The invention claimed is:

1. A removable roofing system comprising a motor inserted inside a drum (2), a cord, a compensation device (4), two rigging rails (5a,5b), at least one guide arch (6a) and a removable roofing, the at least one guide arch (6a) being connected to the cord and to the removable roofing, and being designed so that each of its ends slides in a rigging rail (5a,5b) of the two rigging rails, the cord passing along each rigging rail (5a,5b) and through the compensation device (4) and being connected at its two ends to the drum (2), so that the rotating of the drum (2) by the motor causes the cord to move in a direction dependent on the direction of rotation of the drum (2), deploying or retracting the removable roofing by moving the at least one guide arch (6a), characterised in that each rigging rail (5a,5b) is equipped with at least one end pulley (21a,21b) and with at least two corner-block deflecting pulleys (20a,20b,23a,23b) which are designed to guide the cord from the compensation device to the at least one end pulley (21a,21b), and the compensation device (4) is designed to automatically compensate for variations in cord tension.

2. The removable roofing system according to claim 1, comprising at least one follower arch (6b), connected only to the removable roofing and being designed so that each of its ends slides in the rigging rail (5a,5b) of the two rigging rails.

3. The removable roofing system according to claim 1, wherein the at least one guide arch (6a) and the at least one follower arch (6b) are capable of absorbing a shock applied thereto.

4. The removable roofing system according to claim 1, in which a central part of the drum (2) is equipped with a crown (2a) forming a first worm, the removable roofing system further comprising a guide device (3) equipped with two pulleys (3a,3b) connected to each other by a threaded cylinder (3c) forming a second worm, designed to mesh into the first worm, so that the guide device (3) is rotatably and translationally driven when the drum (2) is rotating, the two pulleys (3a,3b) then moving at a speed such that they are always aligned with the winding point of the cord on the drum (2).

5. The removable roofing system according to claim 1, wherein the compensation device (4) comprises an elongate central support (17), two staples (18a, 18b) slidably mounted onto the elongate central support (17), at least two return springs (16),

- a first staple (18a) of the two staples carrying a seventh pulley (12) and being connected to a first end of the compensation device (4) by at least one springs of the at least two springs (16) so as to compensate for the tension exerted by the cord on the seventh pulley (12), the second staple (18b) of the two staples carrying an eighth pulley (53) and being connected to a second end of the compensation device (4) by at least one spring of the at least two springs (16) so as to compensate for the tension exerted by the cord on the eighth pulley (53) and a trim,
- a first set of pulleys (10,11,12,13,14,19) for returning the cord from the drum (2) to the first rigging rail (5a),
- a second set of pulleys (30,40,41) for returning the cord from the first rigging rail (5a) to the second rigging rail (5b),
- a third set of pulleys (50,51,52,53,54,60) for returning the cord from the second rigging rail (5b) to the drum (2).

6. The removable roofing system according to claim 5, wherein each staple (18a, 18b) comprises a first part, a second part and a third part contiguous to each other, the first and third parts facing each other, the first part, the second part and the third part having each an inner face and an outer face, the inner faces of the first part, the second part and the third part being the faces in regard to the elongated central support, an inner face of each staple comprising the inner faces of the first part, the second part and the third part, the staples (18a, 18b) being arranged on the elongate central support (17) so that their first and third parts are arranged on either side.

7. The removable roofing system according to claim 6, wherein the first part of the first staple (18a) supports the seventh pulley (12) on its inner face, the third part of the second staple (18b) supporting the eighth pulley (53) also on its inner face.

8. The removable roofing system according to claim 6, wherein the at least two return springs (16) are arranged on a same face of the compensation device (4) and are connected to the second parts of the staples (18a, 18b).

9. The removable roofing system according to claim 5, wherein the second set of pulleys (30,40,41) comprises a fourth pulley (40) arranged in a slot provided in the trim of the compensation device (4) so as to be able to change its position, the setting of the position of the fourth pulley (40) enabling the difference in position between the at least one guide arch (6a) ends to be set, in order to modify the position of the at least one guide arch (6a) in regard to the two rigging rails.

10. The removable roofing system according to claim 5, wherein the third set of pulleys (50,51,52,53,54,60) comprises a fifth pulley (50) arranged in a slot provided in the trim of the compensation device (4) so as to be able to change its position, the setting of the position of the fifth pulley (50) enabling the cord tension to be set.

11. An application of the removable roofing system according to claim 1, to a truck, a truck trailer or a building.

* * * * *